(12) United States Patent
Partouche et al.

(10) Patent No.: US 9,361,441 B2
(45) Date of Patent: Jun. 7, 2016

(54) MULTIPLE APPLICATION CHIP CARD HAVING BIOMETRIC VALIDATION

(75) Inventors: Patrick Partouche, Cannes (FR); Philippe Blot, Plaisir (FR); Didier Mobetie, Versailles (FR)

(73) Assignee: MEREAL BIOMETRICS, Paris (FR)

( * ) Notice: Subject to any disclaimer, the term of this patent is extended or adjusted under 35 U.S.C. 154(b) by 39 days.

(21) Appl. No.: 13/518,463

(22) PCT Filed: Dec. 16, 2010

(86) PCT No.: PCT/FR2010/052767
§ 371 (c)(1),
(2), (4) Date: Jun. 22, 2012

(87) PCT Pub. No.: WO2011/083241
PCT Pub. Date: Jul. 14, 2011

(65) Prior Publication Data
US 2012/0260319 A1    Oct. 11, 2012

(30) Foreign Application Priority Data

Dec. 22, 2009  (FR) .................................. 09 59414

(51) Int. Cl.
*G06F 21/00* (2013.01)
*G06F 21/32* (2013.01)
*G06F 21/77* (2013.01)
*G06Q 20/34* (2012.01)
(Continued)

(52) U.S. Cl.
CPC ............... *G06F 21/32* (2013.01); *G06F 21/77* (2013.01); *G06Q 20/3574* (2013.01); *G06Q 20/35765* (2013.01); *G06Q 20/40145* (2013.01); *G07F 7/1008* (2013.01)

(58) Field of Classification Search
CPC .................... G06Q 20/40145; G06Q 20/3574; G06Q 20/35765; G06F 21/32; G06F 21/77; H04L 63/10; H04L 63/107; G07F 7/1008
USPC ............................. 726/4, 20, 9; 713/172, 186
See application file for complete search history.

(56) References Cited

U.S. PATENT DOCUMENTS 6,698,653 B1 *   3/2004   Diamond et al. ............. 235/375
2003/0046554 A1 * 3/2003   Leydier et al. ................ 713/186
(Continued)

FOREIGN PATENT DOCUMENTS

JP   2003-044801      2/2003
JP   2003-346107      12/2003
(Continued)

OTHER PUBLICATIONS

J. Corbet et al., "An Introduction to Device Drivers", URL;http://lwn.net/images/pdf/LDD3/ch01.pd, Jul. 23, 2010, pp. 1-14.

*Primary Examiner* — Mohammad A Siddiqi
(74) *Attorney, Agent, or Firm* — Greer, Burns & Crain, Ltd.

(57) ABSTRACT

A smart card includes a plurality of application circuits that are each related to at least one application service securely contained within the card, each application circuit is energizable by an outside signal; a control unit making it possible to identify the energized application circuit and the related service and moreover to activate the service in response to activation authorization; and a biometric circuit for authenticating the user so as to generate the activation authorization.

13 Claims, 3 Drawing Sheets

(51) Int. Cl.
*G06Q 20/40* (2012.01)
*G07F 7/10* (2006.01)

(56) References Cited

U.S. PATENT DOCUMENTS

| | | |
|---|---|---|
| 2003/0128867 A1* | 7/2003 | Bennett .......................... 382/115 |
| 2004/0111320 A1* | 6/2004 | Schlieffers et al. ............. 705/16 |
| 2005/0040242 A1* | 2/2005 | Beenau et al. ................. 235/492 |
| 2006/0190737 A1 | 8/2006 | Miyasaka |
| 2007/0016940 A1 | 1/2007 | Yearty et al. |
| 2007/0287473 A1* | 12/2007 | Dupray ...................... 455/456.1 |
| 2008/0234935 A1* | 9/2008 | Wolf et al. ..................... 701/216 |
| 2009/0027162 A1 | 1/2009 | Forster |
| 2009/0124376 A1* | 5/2009 | Kelly et al. ....................... 463/29 |
| 2009/0203355 A1* | 8/2009 | Clark ............................. 455/411 |
| 2009/0218401 A1* | 9/2009 | Moran et al. ................... 235/439 |
| 2009/0292580 A1* | 11/2009 | Cross et al. ........................ 705/9 |
| 2010/0036268 A1* | 2/2010 | Ferren et al. .................. 600/504 |
| 2010/0056873 A1* | 3/2010 | Allen et al. .................... 600/300 |
| 2010/0149073 A1* | 6/2010 | Chaum et al. ...................... 345/8 |

FOREIGN PATENT DOCUMENTS

| | | |
|---|---|---|
| JP | 2005-316724 | 11/2005 |
| JP | 2006-039789 | 2/2006 |
| JP | 2009-031877 | 2/2009 |
| WO | 03/084124 | 10/2003 |

* cited by examiner

MULTIPLE APPLICATION CHIP CARD HAVING BIOMETRIC VALIDATION

BACKGROUND

The present invention relates to the technical field of secured access or secured communication devices. It finds a particularly interesting application, although non-exclusively, in the technology of contact or contactless chip cards such as RFID (Radio Frequency Identification) chip cards. The invention relates in particular to an NFC type contactless chip card, Mifare, ISO 14443 or 15693, that is an RF antenna transmitting when it is located in a suitable electromagnetic field.

Generally, an RFID card includes one (or more) silicon electronic chips containing more or less sensitive information and relating to the card's bearer. By way of example in RFID technology chip is generally connected to an antenna. The RFID card can have the conventional format of a chip card, but can also take different forms such as a badge, a tag, a key case and the like. An integrated battery can be provided so as to extend the card functionalities.

RFID technology, based on the electromagnetic induction principle is increasingly widespread in everyday life. Initially used for managing stocks, this technology has been largely widespread in the access control field. It is rapidly expanding in the passport and payment fields. In Japan, for example, it is commonly used as a payment means through the Felica protocol. In the USA, the first payment terminals based on the ISO14443A protocol have already been launched. The launch in France is under way nowadays.

Unfortunately, this keen interest in this technology has been made to the detriment of security. Indeed, an ill-intentioned person can freely access to information contained in an RFID chip. And the entity which is provided with an RFID reader is not sure that the RFID card owner is actually the person whose confidential data are stored in the card.

Systems for authenticating a person using a biometric circuit are known.

From document US20070016940, it is known a card provided with a biometric circuit for identifying the card's bearer and access control means by a password. Document WO03084124 describes a chip card provided with a biometric circuit for authenticating the user and a selecting button for selecting data contained in the card; an RFID circuit for communicating with the outside.

SUMMARY

An object of the present invention is to provide an alternative solution to existing solutions for securing data contained in a card.

The present invention has a wider scope because its object is to provide a new smart card able to integrate numerous functionalities. The present invention contemplates numerous applications in the wireless and/or contact technology.

Another object of the invention is an enriched device able to take the environment in which it is located into account.

At least one of the above mentioned objects is achieved with a wireless communication device, including:
- a plurality of application circuits which are each related to at least one application service securely contained within the device, each application circuit being excitable by an external signal,
- a control unit:
  for identifying an excited application service,
  for identifying an application service related to this excited application circuit, and
  for activating said excited application service in response to an activation authorization, and
- a biometric circuit for authenticating the user so as to generate said activation authorisation.

An application service can include a software application which is run when this application service is activated.

The activation of an application service consists in particular in making it accessible from outside, running an algorithm or unlocking an application or data.

With the device according to the invention, a double check is performed before an application service is activated. The first check is environmental since a signal from the external environment is to be detected. The second check is biometric. A secured, smart and energy saving system is thus available. The device according to the invention is smart because it is auto-adaptive. It is able to recognize the environment in which it is used and to trigger the biometric recognition mechanism which will authorize the corresponding application service or not. The device according to the invention is a multiple application one and can automatically select the suitable application service.

The device according to the invention determines the adapted action or communication channel when faced with a stimulus and has the activation validated by the device bearer thanks to its biometric signature.

According to an advantageous characteristic of the invention, the application circuits include a radiofrequency signal transceiver. It can be a radiofrequency antenna.

The application service which is activated can be any type of application using the radiofrequency antenna. A radiofrequency signal can be used to open a door in hotels or else, or activate a slot machine for example. The control unit can include an RFID type chip.

According to the invention, these application circuits can include at least one metal connector for communicating with a reader for example.

Advantageously, the application circuits include at least one environment detector. This environmental detector can be one of the following elements:
- an acoustic detector;
- a heat detector;
- an olfactory detector;
- a photodetector;
- a pressure detector;
- an accelerometer.

These detectors can in particular be made using MEM sensors.

A control unit can be such that it only identifies an excited application circuit when the excitation achieves a predetermined threshold. It can also be contemplated that the excitation external signal is coded such that the control unit only considers the excitation after the code is analysed. This code can also be used to identify an application service among several possible application services. This code can in particular be in the form of a particular melody in the case of an acoustic detector, a particular light signal wave or frequency in the case of a photodetector, a coded RFID signal, and so forth.

Preferably, the biometric circuit includes a biometric sensor related to a calculation unit for processing biometric data. The data for identifying one or more users can be stored in the calculation unit or in a related memory during an enrolment step. In operation, each time the biometric circuit is requested, the user interacts with the biometric sensor which transmits detected data to the calculation unit for comparison and authentication.

The biometric circuit thus directly generates the activation authorization. But, when the biometric circuit does not include a calculation unit, the comparison can be made within the control unit.

Advantageously, the device according to the invention includes a human-machine interface to indicate an operating state. It can be audio indicators to emit a particular sound, voice or music from a piezoelectric element. It can be visual indicators including LEDs for Light Emitting Diodes. The human-machine interface can also provide a display screen, a keyboard, a microphone and loudspeakers for example, to access the control unit.

The device according to the invention can be powered by an integrated battery or preferably a cell which is flexible or not, rechargeable or not. It can for example be contemplated to use a solar collector to recharge a photovoltaic cell integrated in the device. Otherwise, an external power source can be used, for example when poorly mobile devices are used.

Preferably, the device is a portable element in the format of a chip card, USB key or electronic tag.

According to another aspect of the invention, it is provided a method implemented in a wireless communication card including a plurality of application services, a control unit and a biometric circuit; this method including the following steps:

an excitation external signal is detected by means of one of the application circuits, each application circuit being related to at least one application service securely contained within the card, within the control unit, the excited application circuit and the application service related to this excited application circuit are identified, and an authentication process is started by biometric comparison within the biometric circuit, and then said excited application circuit is activated in response to an activation authorization from the biometric circuit.

Of course, the different characteristics, embodiments and alternatives of the invention can be combined with each other in various combinations with the proviso that they are not mutually incompatible or exclusive.

Besides, various further characteristics of the invention become clear from the description herein below made in reference to the appended drawings which illustrate non-limiting embodiments of an auto-adaptive RFID chip card integrating the biometric circuit.

DETAILED DESCRIPTION In FIGS. 1-9, different elements common to various alternatives or embodiments bear the same references.

The principle of an auto-adaptive card according to the invention is schematically illustrated in FIGS. 1 to 4 wherein a chip card 1 can be distinguished, which includes in the one hand the set of application circuits 2 to 4 and, in the other hand, a biometric circuit 5.

The chip card 1 can include numerous application circuits, only three of them are represented herein. References 2 to 4 respectively represent application circuits n−1, n and n+1. An application circuit can consist of a transceiver related to an application service. Each application circuit is sensitive to a given physical phenomenon. characterising the environment in which the card is located. These physical phenomena can include heat, touch (contact), light, olfactory, sound, pressure, electromagnetic field, and the like. When the card is within an "n" environment, the application circuit n detects the presence of this environment which is directly related thereto, but does not activate the corresponding application service n. This application service can be an exchange protocol with this environment "n" or the running of a particular program.

The other application circuits n−1 and n+1 remain insensitive: the environment "n" is not recognized by these application circuits.

Figure 1:
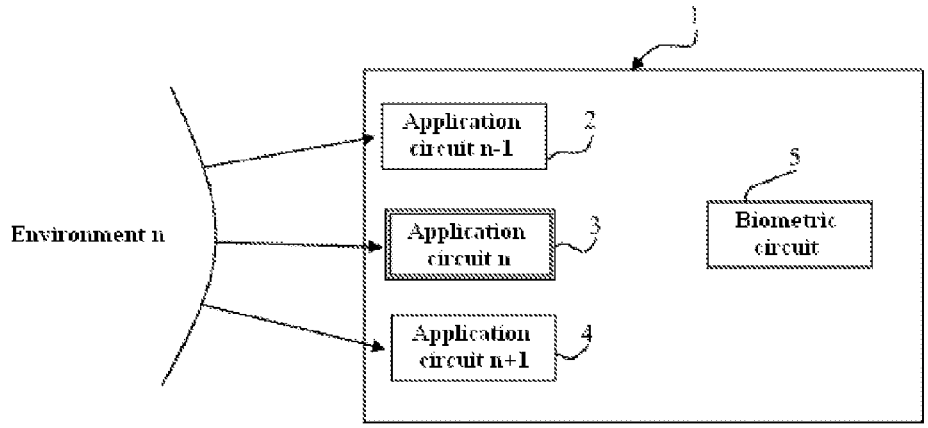
FIGS. 1 to 4 are simplified schemes illustrating the general principle for implementing a device according to the invention.
Figure 2:
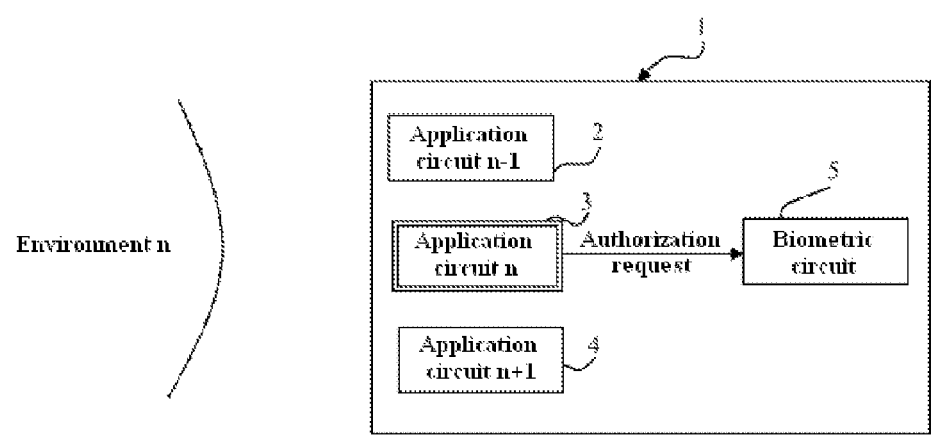

Then, an authorization request is transmitted to the biometric circuit 5 as can be seen in FIG. 2. Upon receiving this authorization request, the biometric circuit starts an authentication process so as to recognize and identify the card user. To do this, the biometric circuit includes a biometric sensor which can be of different types: by analysis of physical characteristics (fingerprint, iris imaging, retina imaging and the like), by behavioral analysis (voice analysis, signature, and the like).

Figure 3:
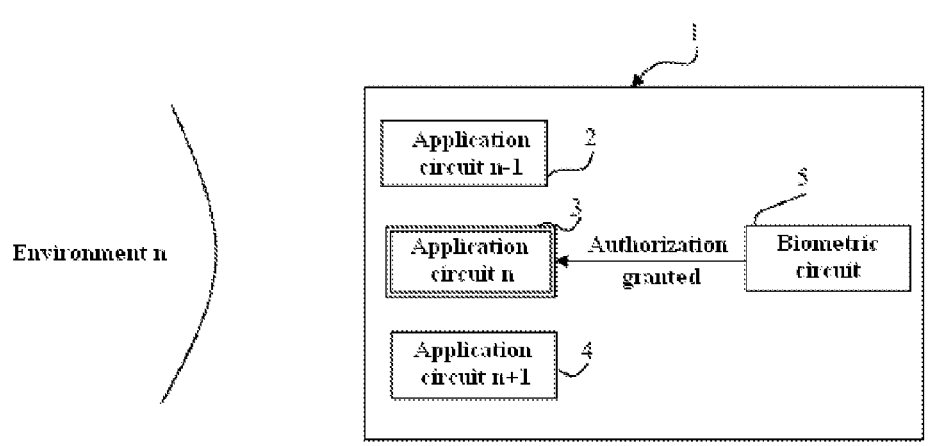
Figure 4:
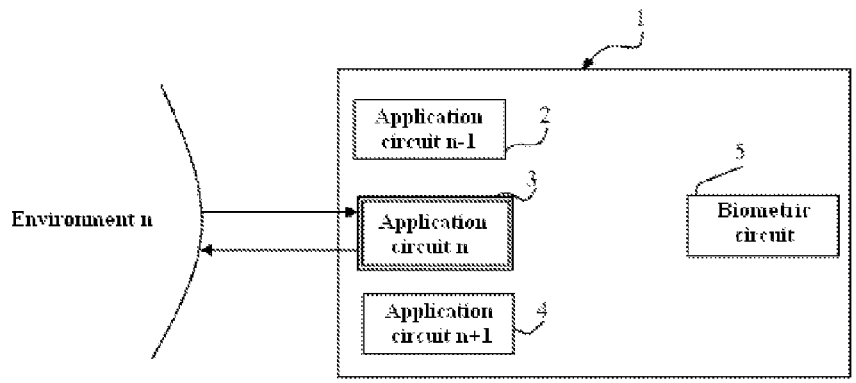
Figure 5:
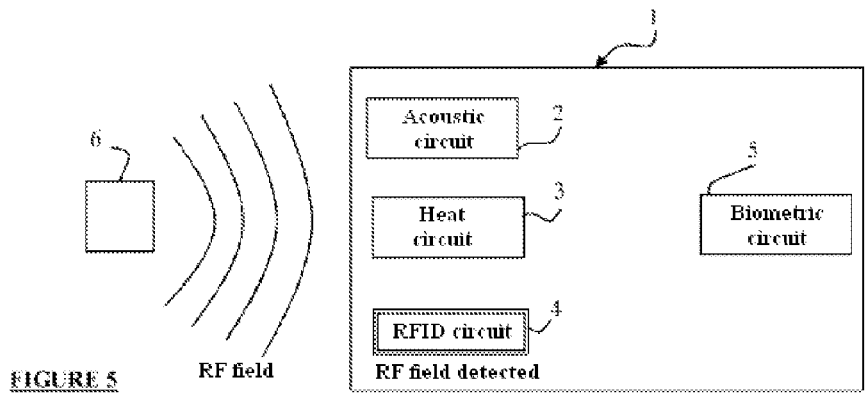
FIGS. 5 to 8 are simplified schemes illustrating an embodiment of the device according to the invention applied to an RFID circuit.
Figure 6:
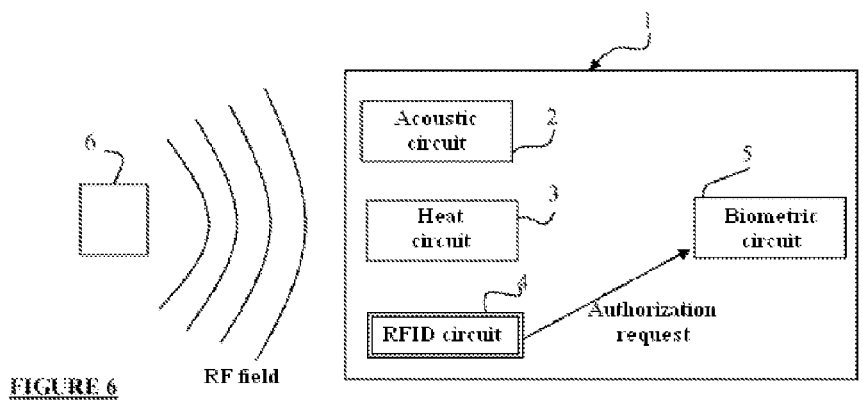
Figure 7:
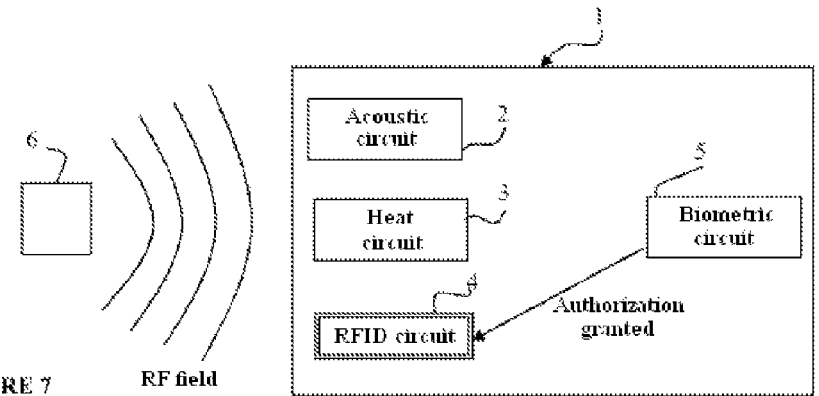

The user must then summit to biometric detection so that the biometric circuit recovers data which are then compared to data contained in the card. When the comparison is satisfactory, the biometric recognition is therefore positive and an agreement signal is sent to activate the application service n as can be seen in FIG. 3. Once the application service is activated, the application circuit n can interact with the environment as can be seen in FIG. 4.

In FIGS. 5 to 8, an exemplary embodiment of a device according to the invention can be seen. The card is still designated by reference 1. Application circuits 2 to 4 are an acoustic circuit, a heat circuit and an RFID circuit respectively.

Figure 8:
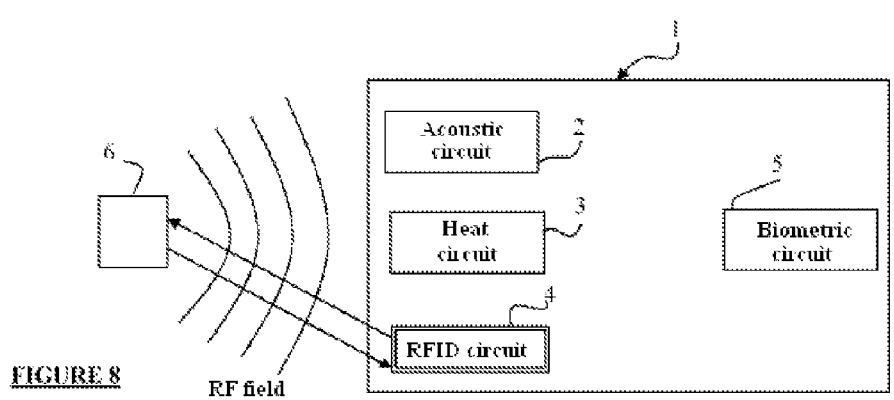

In this exemplary embodiment, the environment is represented by an RFID reader 6 which generates an electromagnetic field or RF field to the chip card 1. The RFID circuit detects this RF field and transmits in FIG. 6 an authorization request to the biometric circuit 5. The purpose of this authorization request is to activate an RFID communication service between the REID circuit 4 and the RFID reader 6. The biometric circuit 5 authenticates the user and then transmits an agreement or disagreement signal to the RFID circuit. In the case of an agreement such as represented in Fig, 7, the RFID circuit activates the communication service which enables in particular data or instructions to be transferred to the RFID reader 6 as illustrated in FIG. 8. The RFID reader 6 can be related to a gate, a slot machine or any other system so that the reception of instructions from the chip card can result in the opening of the gate, the activation of the slot machine, the switching on or standby of a system, and the like.

The instructions can include user's personal data as well as instructions, whether coded or not, intended for the RFID reader 6.

The environment signal detected by an application circuit can be a signal whether coded or not, for distinguishing in particular which application service needs to be activated when for example several application services are likely to be activated via this application circuit.

It can be contemplated that the activated application service launches a communication with a slot machine through a RF field for, for example, credit a user's account in the slot machine or recover profits earned by the user, in particular in real time.

Figure 9:
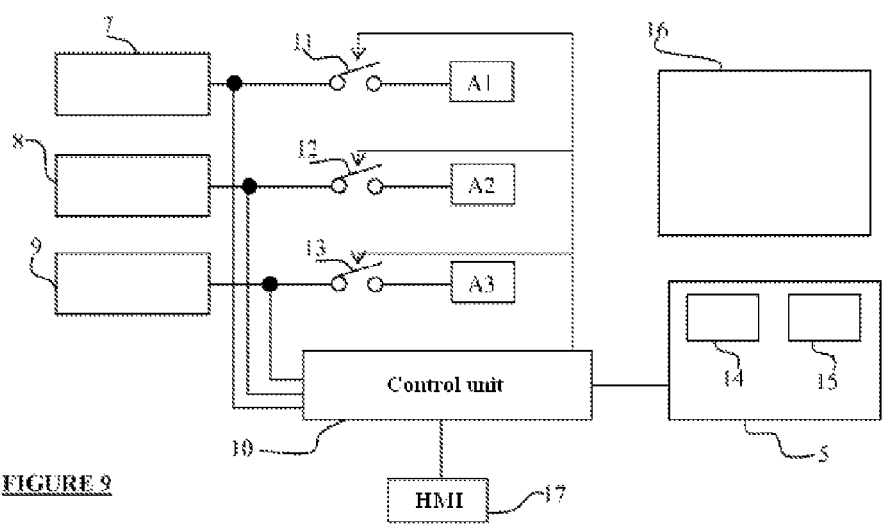
FIG. 9 is a general view of a chip card according to the invention.

FIG. 9 is a simplified block diagram of an exemplary chip card according to the invention. An acoustic transceiver 7 related to a single application service A1 can be distinguished. The heat transceiver 8 is related to a single application A2. The RFID transceiver 9 is related to a single application service A3. A more complex system can be contemplated, wherein a transceiver is related to several application services. It is further possible to use several excitation signals simultaneously detected by several transceivers for determining a suitable application service for the environment under way.

As illustrated in FIG. 9, in each link between the transceiver and its related application service, a controlled switch 11, 12 and 13 is respectively introduced, such that an application service is activated only when the related controlled switch is ON.

In FIG. 9, each transceiver 7, 8 and 9 is connected to a control unit 10 which manages all the components and software programs of the chip card 1. The control unit 10 is a microcontroller equipped with:
 a flash memory containing the software applications for its own operation and intended to control the biometric circuit 5,
 a RAM memory,
 a clock, and
 several inputs/outputs.

It is in the form of a chip integrated in the card and has a reduced consumption. The control unit 10 is configured to switch on one of the switches 11, 12 and 13 in response to an activation agreement emitted by the biometric circuit 5.

A human-machine interface HMI 17 includes displaying, keying, audio and visual broadcasting means. The visual broadcasting can be made via light emitting diodes LEDs. An integrated battery 16 powers all the components of the card 1.

The biometric circuit 5 includes a biometric sensor 14 which deals with keying raw biometric data. A fingerprint sensor is used. The biometric circuit 5 also includes a calculation unit 15 able to process biometric data so as to perform enrolment and fingerprint comparisons.

The enrolment occurs the following way:
 the user activates the card via the control circuit,
 the control circuit activates the biometric circuit by putting it into "enrolment" mode,
 the user puts his/her finger on the fingerprint sensor which sends corresponding information to the calculation unit, and
 when this information is transferred and then stored in the calculation unit, the control unit informs the user that the enrolment took place successfully through the HMI interface 17.

The operation of the card can be the following. When an excitation signal is detected by one of the transceivers 7, 8 or 9, for example the transceiver 7, the control unit 10 is activated and starts an authentication process:
 the control circuit activates the biometric circuit by putting it into "authentication" mode,
 the user places his/her finger on the fingerprint sensor which sends corresponding information to the calculation unit,
 the calculation unit compares this information with information previously stored during the enrolment phase, and
 after authentication, the control unit informs the user of the result and deactivates the biometric circuit.

In the case of a positive response (successful authentication), the control unit then switches on the switch 11 so as to enable the communication of the application service A1 with the external environment via the transceiver 7. Of course, the controlled switches 11, 12 and 13 can be made in a software form, the access to the application services being achieved after receiving an authentication agreement.

Of course, the invention is not restricted to the examples just described and numerous alterations can be made to these examples without departing from the scope of the invention. The device is applicable to different fields such as:
 the bank field,
 the individual identification,
 the game field,
 the digital key for opening doors,
 the message recording/reading field,
 the data recovery,
 the medical field for example for blood or DNA testing.

The invention claimed is:

1. A secured communication device, comprising:
 a plurality of application circuits disposed in the device, which are each related to at least one application service securely contained within the device, each application circuit being excitable by an external signal received from a surrounding environment of the device, and selectively responsive to a given physical phenomenon of the surrounding environment of the device;
 a control unit disposed in the device making it possible to identify the excited application service, the related application service and to activate said application service in response to an activation authorization; and
 a biometric circuit disposed in the device for authenticating a user so as to generate said activation authorization,
 wherein at least one of said plurality of application circuits, being coupled to said control unit and said biometric circuit within the device, detects said external signal based on the given physical phenomenon caused by said external signal,
 wherein an authorization request is transmitted from said corresponding application circuit to said biometric circuit, and upon receiving the authorization request, said biometric circuit starts an authentication process for identifying the user,
 wherein said biometric circuit performs biometric comparison with data contained in the device, and upon satisfactory comparison, an agreement signal is sent from said biometric circuit to said corresponding application circuit for granting said activation authorization, and
 wherein said application service is activated based on said activation authorization such that said corresponding application circuit interacts with the surrounding environment.

2. The device according to claim 1, wherein the application circuits include a radiofrequency signal transceiver.

3. The device according to claim 1, wherein the application circuits include at least one metal connector.

4. The device according to claim 1, wherein the application circuits include at least one environmental detector.

5. The device according to claim 1, wherein the application circuits include at least one of the following elements:
 an acoustic detector;
 a heat detector;
 an olfactory detector;
 a photodetector;
 a pressure detector; and
 an accelerometer.

6. The device according to claim 1, wherein the biometric circuit includes a biometric sensor related to a calculation unit for processing biometric data.

7. The device according to claim 1, further including a human-machine interface for indicating an operating state of the device.

8. The device according to claim 1, wherein the secured communication device is powered by a cell which is at least one of flexible and rechargeable.

9. The device according to claim 1, wherein the secured communication device is powered by an external source.

10. The device according to claim 1, wherein the secured communication device is in the format of a chip card, USB key or electronic tag.

11. The device according to claim 1, wherein the given physical phenomenon includes at least one of heat, touch or contact, light, olfactory, sound, pressure, and electromagnetic field.

12. A method implemented in a secured communication device including a plurality of application circuits, a control unit and a biometric circuit; the method including the following steps:
- an excitation external signal received from a surrounding environment of the device is detected by means of one of the application circuits, each application circuit, disposed in the device, being related to at least one application service securely contained within the device, and selectively responsive to a given physical phenomenon of the surrounding environment of the device; and
- within the control unit, the excited application circuit and the application service related to this excited application circuit are identified, and an authentication process is started by biometric comparison within the biometric circuit disposed in the device, and then said excited application circuit is activated in response to an activation authorization from the biometric circuit, wherein at least one of said plurality of application circuits, being coupled to said control unit and said biometric circuit within the device, detects said external signal based on the given physical phenomenon caused by said external signal, wherein an authorization request is transmitted from said corresponding application circuit to said biometric circuit, and upon receiving the authorization request, said biometric circuit starts an authentication process for identifying a user, wherein said biometric circuit performs biometric comparison with data contained in the device, and upon satisfactory comparison, an agreement signal is sent from said biometric circuit to said corresponding application circuit for granting said activation authorization, and wherein the application service is activated based on said activation authorization such that said corresponding application circuit interacts with the surrounding environment.

13. The method according to claim 12, wherein the given physical phenomenon includes at least one of heat, touch or contact, light, olfactory, sound, pressure, and electromagnetic field.

* * * * *